United States Patent [19]

Böning et al.

[11] 4,418,567

[45] Dec. 6, 1983

[54] KNOCK SENSING APPARATUS WITH FAIL INDICATOR FOR USE IN AN INTERNAL COMBUSTION ENGINE

[75] Inventors: Bernward Böning, Ludwigsburg; Rudolf Nagel, Asperg; Günter Hönig, Ditzingen; Uwe Kiencke, Ludwigsburg; Heinz Theuerkauf, Braunschweig-Hondelage, all of Fed. Rep. of Germany

[73] Assignee: Robert Bosch GmbH, Stuttgart, Fed. Rep. of Germany

[21] Appl. No.: 195,385

[22] Filed: Oct. 9, 1980

[30] Foreign Application Priority Data

Oct. 19, 1979 [DE] Fed. Rep. of Germany ....... 2942250

[51] Int. Cl.³ .............................................. G01L 23/22
[52] U.S. Cl. ..................................................... 73/35
[58] Field of Search ..................... 73/35; 123/425, 435, 123/479

[56] References Cited

U.S. PATENT DOCUMENTS

| | | | |
|---|---|---|---|
| 2,530,931 | 11/1950 | Alexander | 73/35 X |
| 4,012,942 | 3/1977 | Harned | 73/35 |
| 4,243,009 | 1/1981 | Staerzl | 123/479 X |
| 4,320,729 | 3/1982 | Sawada et al. | 123/425 |

Primary Examiner—James J. Gill
Attorney, Agent, or Firm—Frishauf, Holtz, Goodman & Woodward

[57] ABSTRACT

The knock sensing equipment has a control circuit which generates gating signals for dividing the operation into a measuring phase and a test phase. In the latter, the possible malfunction of the sensor is determined. During the test phase, the sensor responds either to background noise or to a test voltage and the sensing output signals are compared to a predetermined minimum and/or maximum level. Malfunction is indicated if the signals furnished by the sensor are outside of the indicated range.

11 Claims, 5 Drawing Figures

4,418,567

KNOCK SENSING APPARATUS WITH FAIL INDICATOR FOR USE IN AN INTERNAL COMBUSTION ENGINE

Cross-reference to related applications and publications: U.S. Pat. No. 3,822,583 hereby incorporated by reference.

The present invention relates to knock sensing apparatus in internal combustion engines.

BACKGROUND AND PRIOR ART

Knocking in an internal combustion engine is sensed by sensors which are responsive to oscillations at particular locations in the engine. The sensors utilized include pressure sensors, force sensors or acceleration sensors. The signal furnished by the sensor generally includes a background noise signal which is generated during normal operation of the engine even in the absence of knocking. This background noise varies generally in direct dependence upon engine speed and load. Since the desired signal indicative of engine knocking has a particular frequency, this must be filtered out of the signal including the background noise. Such apparatus is described in German Published Patent Application DE-AS No. 24 45 067. In the apparatus disclosed in this German publication, a correction signal is subtracted from the total sensor output signal. The subtraction signal corresponds to the average intensity of the background noise before the start of engine knocking. The correction signal is generated by creating an average value throughout a relatively long-time interval, so that errors due to momentary variations are eliminated. U.S. Pat. No. 3,822,583 describes a method and apparatus for measuring knocking in an internal combustion engine and for determining the octane value. In this apparatus also, the sensor furnishes a signal which includes both background noise and the desired knock signals. The latter are filtered in the knock frequency range and are then amplified. The sensor output signals, including the knock signals, are compared to a level indicative of the average background noise, the positive differences integrated and then used as a control signal for determining the ignition timing. All of the above-described systems and methods have the common disadvantage, that malfunctioning and, in particular, a total lack of operation of the sensor cannot be recognized. A complete lack of output signals from the sensor resembles similar signals which are generated when the engine is not knocking. A corresponding regulation of ignition timing would then cause the engine to be driven even further into the knock region.

THE INVENTION

It is an object of the present invention to prevent the above-mentioned disadvantages by furnishing a signal indicative of malfunction and, more specifically, of complete dropout of the sensing means.

Therefore, in accordance with the present invention, equipment is supplied which furnishes a fail signal upon malfunction of the sensing means.

DRAWINGS ILLUSTRATING A PREFERRED EMBODIMENT

Figure 1:
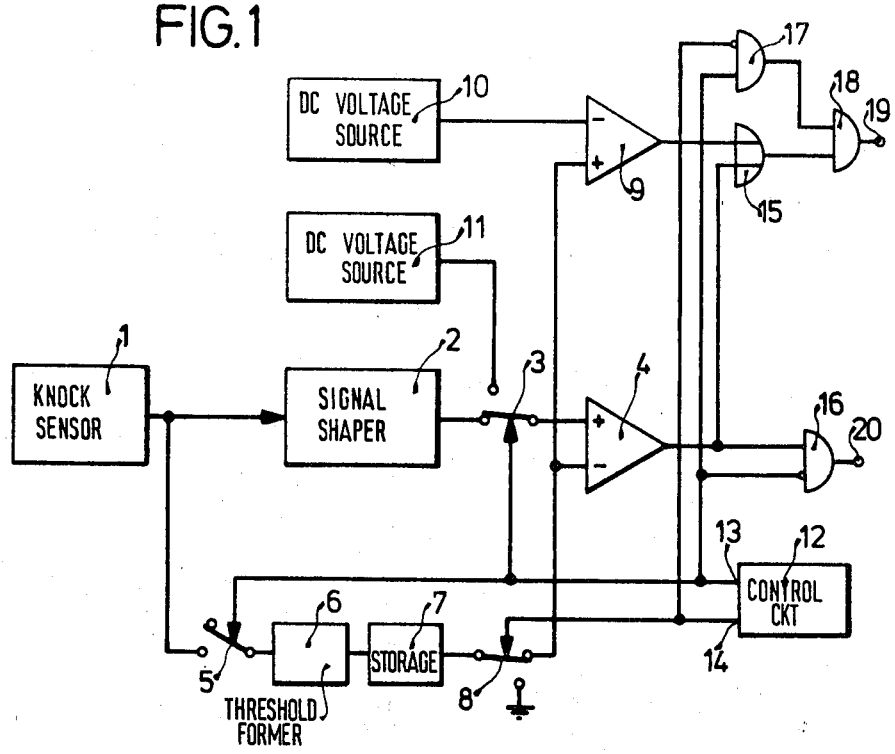
FIG. 1 shows a first preferred embodiment of the present invention.

DESCRIPTION OF THE PREFERRED EMBODIMENT:

In the embodiment of FIG. 1, a knock sensor 1, which may be a piezoelectric force, pressure, or acceleration sensor, or a torsion sensor, is connected to a signal shaping circuit 2. Signal shaping circuit 2 can include a filter, a rectifier and an integrator. The output of signal shaping circuit 2 is connected through a normally closed switch 3 to the positive input of a comparator 4. The output of knock sensor 1 is also connected through a normally open switch 5 to a circuit 6 which forms the threshold value. For example, circuit 6 may contain a rectifier and a low-pass filter having a large time constant, e.g. 5 msec. Threshold forming circuit 6 is connected to a storage element 7 which, in this case, is a capacitor. The output of storage element 7 is connected through the normally closed contact of a selector switch 8 to the inverting input of a comparator 4 and the direct input of a comparator 9. When selector switch 8 is in its second position, storage element 7 is connected to ground potential so that it discharges. The voltage applied to the inverting input of comparator 9 constitutes a maximum level. In the simplest case, this voltage is furnished by a DC voltage source 10. Switch 3 also has a normally open position which applies a voltage constituting a minimum level to the direct input of comparator 4. Again, this voltage can be furnished by a DC voltage source 11. The control of switches 3, 5 and 8 is furnished by a control circuit 12. Control circuit 12 delivers gating voltages during time periods constituting the measuring phase, the testing phase and the phase for discharging storage element 7. Output 13 of control circuit 12 is connected to switches 3 and 5, while output 14 is connected to switch 8. A suitable control circuit which furnishes such gating voltages cyclically and in dependence on engine speed is described in German publication DE-OS No. 29 18 420.1. The outputs of comparators 4 and 9 are connected to respective inputs of an OR gate 15. Further, the output of comparator 4 is connected to the first input of an AND gate 16. A second, inverting input of AND gate 16 is connected to the output 13 of control circuit 12. Output 13 is further connected to the input of an AND gate 17. The output 14 of control circuit 12 is connected to the inverting input of AND gate 17. The outputs of AND gate 17 and OR gate 15 are connected to respective inputs of an AND gate 18 whose output 19 furnishes a signal indicative of possible failure of knock sensor 1. The signal at output 20 of AND gate 16 signifies the absence or presence of engine knock.

Figure 2:
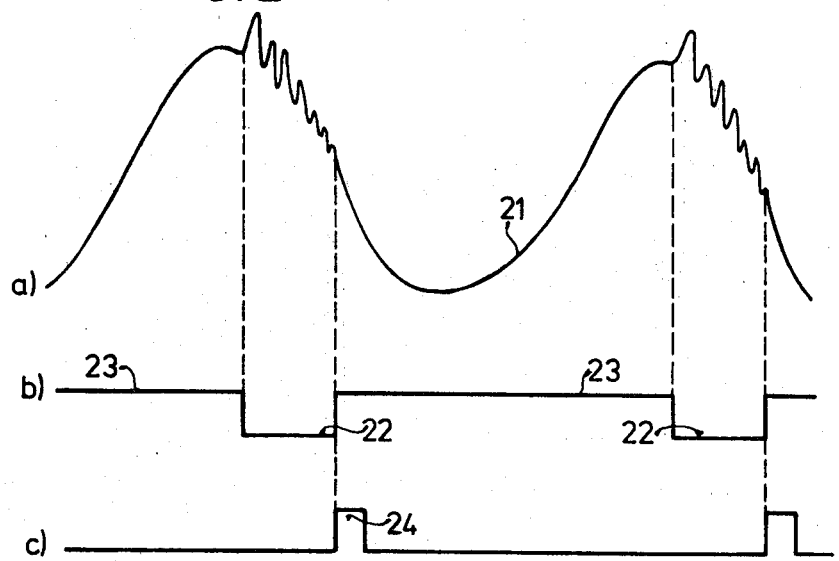
FIG. 2 shows the variation with respect to time of pressure in the cylinder, during the measuring phase, the test phase and a phase for erasing a storage element.

Operation, with reference to FIG. 2

FIG. 2, graph a, shows the variation of pressure in a cylinder of a four-cylinder internal combustion (IC) engine as a function of ignition angle or crankshaft angle. The ignition time of the compressed fuel-air mixture is shown at point 21. Thereafter the pressure in the cylinder of the internal combustion engine increases, reaches a maximum, and, after this maximum is reached, may experience excessive pressure increases which are known as knock oscillations. The region denoted by reference numeral 22 is herein referred to as the measuring phase. Within this phase, the presence of engine knock oscillations is to be sensed. The phase in which the proper operation of knock sensor 1 is tested is herein referred to as the testing phase occurring subsequent to the period when knocking may occur, and is denoted by reference numeral 23. During the test phase 23, i.e. when knocking does not occur—see FIG. 2, the output 13 of control cirucit 12 carries a positive potential which, in the positive logic to be applied herein, is denoted as a logic "1". This logic "1" causes switches 3 and 5 to be activated, i.e. switched over from the position shown in FIG. 1, that is knock sensor 1 is directly connected to circuit 6 which forms the threshold value. Similarly, DC voltage generator 11 is connected to the positive input of comparator 4. The signals from knock sensor 1, which are generated by the background noises of the engine are applied to circuit 6 and, through storage element 7, directly to comparators 4 and 9. The second input of comparator 4 receives a voltage which represents a minimum level, while the second input of comparator 9 receives a voltage indicative of a maximum level. The limiting values (mininum and maximum level) may be varied as a function of various motor parameters (for example, engine speed, load) and need not necessarily be supplied by a DC voltage source as shown. In comparators 4 and 9 the signal output of the knock sensor is compared to the minimum and maximum level, respectively. If the signals furnished by knock sensor 1 are between the two boundary values, then the outputs of comparators 4 and 9 are at a logic "0", that is at a low potential as, for example, zero volts. If the signal furnished by knock sensor 1 is below the minimum level, sensor 1 is defective or a short circuit exists. Under these conditions, the output of comparator 4 and that of OR gate 15 is a logic "1".

If, at this time, the second input of AND gate 18 also carries a "1" signal, then output 19 of AND gate 18 carries a logic "1" signal and the signal indicating a defective knock sensor is furnished. The second input to AND gate 18 is a logic "1", since during the test phase, the signals on line 14 and on line 13 are on a "0" and a "1", respectively. If the signal furnished by knock sensor 1 exceeds the maximum level, which, for example, may be the case for a break in the line, then the output of comparator 9 is a logic "1", while the output of comparator 4 is a "0". This again causes the signal at output 19 of AND gate 18 to be a "1" indicating that there is a defect in the sensor.

During the measuring phase, the potential at output 13 of control circuit 12 is a "0" and switches 3 and 5 are in their normal position, that is in the position indicated in FIG. 1. The signal of knock sensor 1 is applied to signal shaping circuit 2 and passes through switch 3 to the direct input of comparator 4. The inverting input of comparator 4 at the same time receives the threshold value. This threshold value was generated during test phase 23 by the threshold forming circuit 6 which was responsive to the background noises of the engine. The value was then stored in storage element 7. If the output of knock sensor 1 exceeds the threshold value, the output of comparator 4 is at a logic "1" and a "0" exists at the inverting input of AND gate 16. Therefore a "1" signal appears at output 20 of AND gate 16 and the fact that the engine is knocking is indicated.

The value stored in storage element 7 is to be erased at the start of each test phase 23. For this purpose, switch 8, under the control of control circuit 12, is briefly connected to ground potential as indicated in FIG. 2c (region 24). Output 14 of control circuit 12 is then at a logic "1" potential. The gating signal for creating phase 24 can be formed by a suitable circuit, e.g. as disclosed in German Patent Disclosure Document DE-OS No. 29 18 420, as was the case with the gating signals required to create test phase 23 and measuring phase 22. Alternatively, it can be created by a mono-stable multivibrator which is connected to output 13 of control circuit 12 and is connected to switch 8. When switch 8 is operated by such a mono-stable multivibrator, the time for erasing the value in storage element 7 is independent of engine speed.

Figure 3:
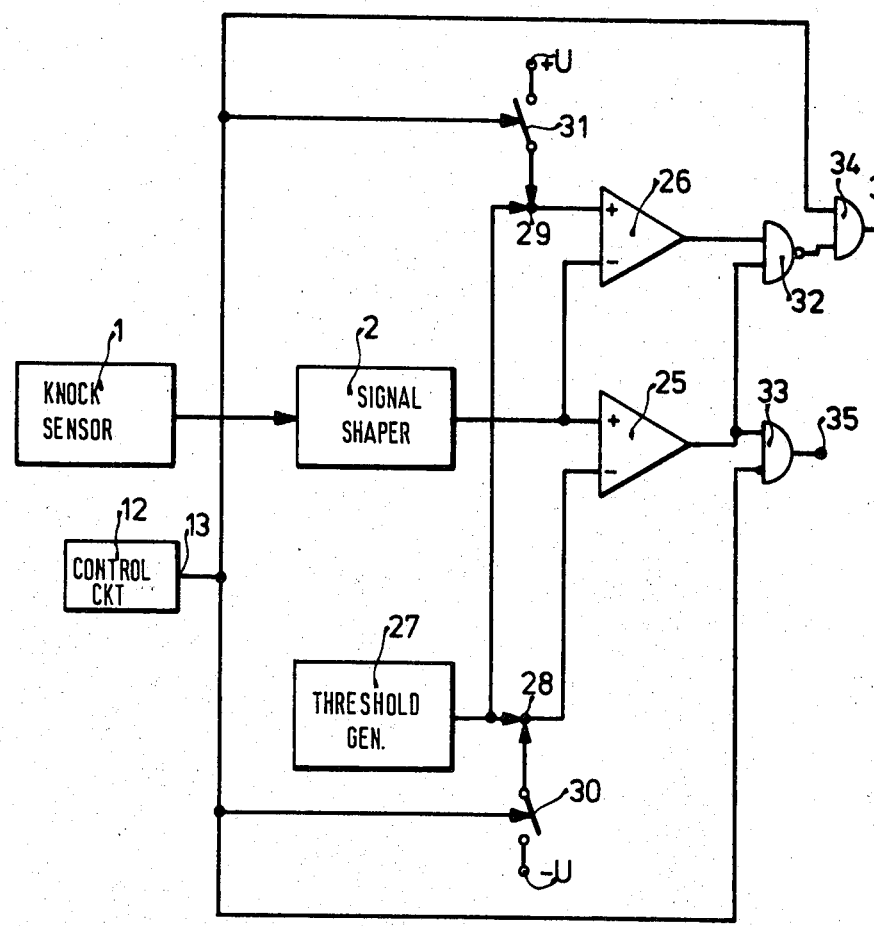
FIGS. 3-5 illustrate alternate embodiments of the present invention.

In the embodiment shown in FIG. 3, the components which are already present in FIG. 1 and have the same function as in FIG. 1 have the same reference numerals. Again, knock sensor 1 is connected to a signal shaping circuit 2 whose output is connected to the direct input of a comparator 25 and the inverting input of a comparator 26. A circuit for creating the knocking threshold value 27 is, on the one hand, connected to a summing point 28 whose output is connected to the inverting input of a comparator 25 and, on the other other hand, to a summing point 29 whose output is connected to the direct input of comparator 26. A negative voltage U, which is furnished by a voltage source, is applied to summing point 28 through a switch 30 which is a normally open switch. A positive voltage U, also furnished by a voltage source, is connected through a corresponding switch 31 to summing point 29. Output 13 of control circuit 12 is connected to switches 30 and 31. The outputs of comparators 25 and 26 are connected to respective inputs of an AND gate 32, whose output is connected to one input of an AND gate 34. The other input of AND gate 34 is connected to output 13 of control circuit 12. Further, the output of comparator 25 is connected to the first input of an AND gate 33 whose second input, an inverting input, is connected to output 13 of control circuit 12. The signal at output 35 of AND gate 33 is indicative of the absence or presence of engine knock, while the signal at the output 36 of AND gate 34 indicates the absence or presence of a defect in the sensor.

The functioning of the embodiment shown in FIG. 3 is similar to that in FIG. 1. In the measuring phase 22, the signal from knock sensor 1 is applied via signal shaping circuit 2 to the direct input of comparator 25 and to the inverting input of comparator 26. The second input of each comparator receives the knock threshold value, which is furnished by circuit 27. The knock threshold can either be a fixed value, or may be variable in dependence on motor parameters as, for example, speed and load. During the measuring phase 22, the output 13 of control circuit 12 carries a logic "0" signal so that switches 30 and 31 are in the position shown in FIG. 3, that is they are both open. If the signal at the output of knock sensor 1 exceeds the knock threshold value, then a logic "1" signal exists at the output of comparator 25 while a logic "0" signal exists at the output of comparator 26. The signal at output 35 of AND gate 33 indicates the presence of engine knock, while the signal at the output 36 of AND gate 34 indicates that the knock sensor is operating properly.

During the test phase 23, a "1" potential is present at output 13 of control circuit 12. Therefore switches 30 and 31 are closed. At summing point 28, the negative voltage −U is added so that the inverting input of comparator 25 receives a voltage which is less than the knock threshold. At summing point 29, a positive voltage +U is added, so that the noninverting input of comparator 26 receives a voltage which exceeds the knock threshold. Of course the positive and negative voltages which are added at summing points 28 and 29 may have values which differ from one another. The second inputs of comparators 25 and 26 receive the signal generated by the background noise in knock sensor 1. If the signal furnished by knock sensor 1 is not within the tolerance region which is generated by the addition of ±U around the characteristic curve of the knock threshold, then output 36 furnishes a signal which indicates the malfunctioning of the sensor. Switch 31 through which the voltage +U is added to summing point 29 may also be omitted, so that the voltage +U is always applied to summing point 29.

Figure 4:
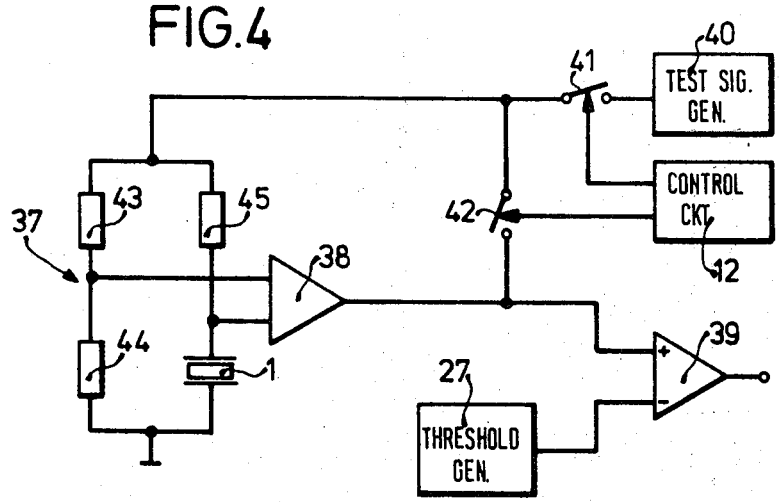

In the embodiment shown in FIG. 4, the knock sensor 1 is a torsion sensor or transducer. The knock sensor is connected into one branch of a bridge circuit 37 whose impedances include complex and real impedances. The output of bridge circuit 37 is connected to two inputs of a difference amplifier 38. The output of difference amplifier 38 is connected to the direct input of a comparator 39, while the inverting input of comparator 39 is connected to a circuit for generating the knock threshold value. The output of comparator 39 furnishes a signal indicative of the absence or presence of engine knock and of the absence or presence of sensor malfunction. A generator 40, which, for example, is a sine wave generator, is connected through a normally open switch 41 to the input of bridge circuit 37. Further, the output of difference amplifier 38 is connected through a switch 42, also a normally open switch, to the input of bridge circuit 37. Switches 41 and 42 are both controlled by control circuit 12.

Since torsion sensors continue to oscillate even after the end of the excitation, the torsion oscillator must be damped before the start of measuring and test phases 22, 23. In the damping phase, a movement of the oscillator (torsion sensor) is to be prevented, that is the electrical voltage resulting from the mechanical deformation should be regulated to zero. For this purpose, the output voltage of difference amplifier 38 is connected back to the input of bridge circuit 37 through closed switch 42 during the damping phase. The voltage appearing across torsion sensor 1 is therefore compensated for. An effective damping has been achieved when the bridge circuit is balanced. In the resonance case, impedance 44 may be embodied in an RC circuit, impedances 43 and 45 being resistors. Another possibility is that impedance 43 and 44 are resistors and the RC circuit forms impedance 45. For automatic balancing of the bridge, an electronically variable capacitance diode may be substituted for the capacitor of the RC circuit, so that temperature changes and changes due to aging are also compensated for.

During the test phase during which switch 41 is closed and switch 42 is open, knock sensor 1 is not energized by the background noise of the engine as was the case in the previous embodiments, but an additional test voltage is applied to the knock sensor. The latter is furnished by generator 40. The signal then generated by knock sensor 1 is compared to the knock threshold value and comparator 39. The knock threshold value in the present embodiment also constitutes the threshold value for recognizing malfunction of the sensor. As was the case in the embodiment shown in FIG. 3, the threshold value may be altered during the test phase by taking into consideration additional engine parameters so that desired requirements are met. Also, as was the case in FIGS. 1 and 3, other limiting values may be provided with which the signal generated by knock sensor 1 is compared during the test phase.

Figure 5:
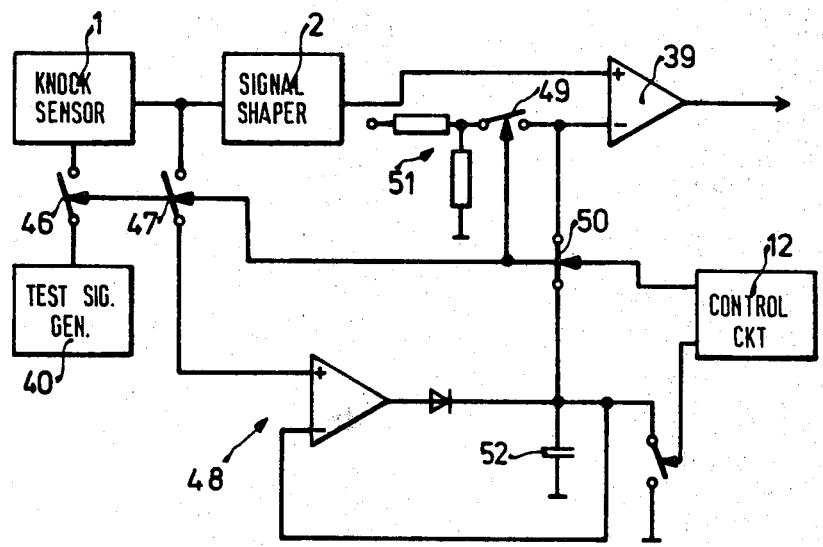

In the embodiment shown in FIG. 5, the knock sensor is energized by a test voltage furnished by a generator 40, which is a sine wave generator. For this purpose, switches 46 and 47 which are controlled by control circuit 12 are closed. The signal furnished by knock sensor 1 is applied to a signal shaping stage 2 whose output is connected to the direct input of a comparator 39. The signal furnished by knock sensor 1 is also applied to a peak value storage 48. Peak value storage 48 comprises a difference amplifier, a rectifier connected to the output of the difference amplifier and a capacitor connected from the cathode of the difference amplifier to reference or ground potential. The output of peak value storage 48 is also connected back to the input of the difference amplifier. A switch 49 is connected between the inverting input of comparator 39 and the tap of a voltage divider 51. A normally closed switch 50 connects the output of the peak storage 48 to the inverting input of comparator 39. Switches 49 and 50 are controlled by control circuit 12, as is a switch for discharging capacitor 52. During the test phase, switch 49 is closed and switch 50 is open. The voltage at the inverting input of comparator 39, namely the voltage at the tap of voltage divider 51, constitutes the threshold value for deciding whether sensor 1 is operative or inoperative.

In the measuring phase, switches 46, 47 and 49 are open and switch 50 is closed. The signal furnished by knock sensor 1 is then applied to one input of comparator 39, while the value stored in peak value storage 48 is applied to the inverting input. As in the embodiment shown in FIG. 1, capacitor 52 is discharged before the start of the test phase under control of control circuit 12.

All switches shown in all of the above embodiments are preferably constituted by electronic switches such as thyristors or transistors.

Various changes and modifications may be made within the scope of the inventive concepts.

We claim:

1. Apparatus for furnishing a knock signal indicative of knocking in an internal combustion engine comprising sensing means (1; 43, 44, 45, 38) for sensing mechanical oscillations in the internal combustion engine and furnishing sensing output signals corresponding thereto, said sensing output signals constituting said knock signal in the presence of engine knocking;

control circuit means (12) for generating a first gating signal defining a measuring phase (22) during which the sensing output signals are measured for presence of said knock signal, and a second gating signal defining a test phase (23) during which the sensing output signals are measured to determine proper operation of the sensing means and generating "fail" signals if said measurement determines improper operation of the sensing means, including comparator means (4, 9) for comparing, during said test phase, said sensing output signals to (a) a first reference signal indicative of a predetermined minimum level, and (b) to a second reference signal indicative of a predetermined maximum level, and switch means (3, 5) controlled by said gating signals and connecting, during said test phase, the sensing output signals to the comparator means.

2. Apparatus as set forth in claim 1, wherein said predetermined minimum level varies as a function of predetermined parameters of said engine.

3. Apparatus as set forth in claim 1, wherein said predetermined maximum level varies as a function of said engine parameters.

4. Apparatus as set forth in claim 1, further comprising storage means (7, 48) for storing sensing output signals generated in said test phase, thereby creating a stored signal; and wherein said stored signal constitutes a knock threshold value during said measuring phase.

5. Apparatus as set forth in claim 4, wherein said sensing means senses background noise of said engine during said test phase, whereby said sensing output signals correspond to said background noise.

6. Apparatus as set forth in claim 1, wherein said sensing means senses background noise of said engine during said test phase, whereby said sensing output signals correspond to said background noise.

7. Apparatus as set forth in claim 1, wherein said comparator means comprises a first and second comparator (4, 9; 25, 26) each having a first and second input; wherein said sensing output signals are applied to said first inputs of said first and second comparator during said test phase, and wherein said first reference signal is applied to said second input of said first comparator and said second reference signal is applied to said second input of said second comparator.

8. Apparatus as set forth in claim 7, further comprising a first and second output terminal (35, 36) for furnishing said knock and fail signals, respectively;

further comprising logic circuit means (32, 33, 34) for connecting said comparator output signals to said first and second output terminal during said measuring and test phase, respectively.

9. Apparatus for furnishing a knock signal indicative of knocking in an internal combustion engine comprising sensing means (1; 43, 44, 45, 38) for sensing mechanical oscillations in the internal combustion engine and furnishing sensing output signals corresponding thereto, said sensing output signals constituting said knock signals in the presence of engine knocking;

control circuit means (12) for generating a first gating signal defining a measuring phase (22) during which the sensing output signals are measured for presence of said knock signal, and a second gating signal defining a test phase (23) subsequent to said measuring phase during which the sensing output signals are measured to determine proper operation of the sensing means and generating "fail" signals if said measurement determines improper operation of the sensing means, said second gating signal occuring during a portion of the engine operating cycle when no knocking signals occur;

means (40) for applying a test voltage to said sensing means during said test phase;

and means (27, 39;) for evaluating the sensing output signals to determine if (a) said output signals corresponds to a first criterion indicative of malfunction of the sensor; or (b) the output signals correspond to a second criterion indicative of proper operation of the sensor; and switch means (41, 42; 46, 47) controlled by said gating signals and connecting, during said test phase, the sensing output signals to the evaluation means.

10. Apparatus as set forth in claim 9, wherein the amplitude of said test voltage varies as a function of then-present values of predetermined engine parameters.

11. Apparatus as set forth in claim 9, further comprising storage means (7, 48) for storing sensing output signals generated in said test phase, thereby creating a stored signal; and wherein said stored signal constitutes a knock threshold value during said measuring phase.

* * * * *